US012163531B2

(12) United States Patent
Cote

(10) Patent No.: US 12,163,531 B2
(45) Date of Patent: Dec. 10, 2024

(54) BANDED COOLING FAN BAND HAVING KNIT-LINE STRENGTH IMPROVEMENT

(71) Applicant: Robert Bosch GmbH, Stuttgart (DE)

(72) Inventor: Ray Cote, Dover, MA (US)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 18/000,958

(22) PCT Filed: Apr. 6, 2021

(86) PCT No.: PCT/EP2021/058881
§ 371 (c)(1),
(2) Date: Dec. 7, 2022

(87) PCT Pub. No.: WO2021/204768
PCT Pub. Date: Oct. 14, 2021

(65) Prior Publication Data

US 2023/0228279 A1 Jul. 20, 2023

Related U.S. Application Data

(60) Provisional application No. 63/147,500, filed on Feb. 9, 2021, provisional application No. 63/147,511, filed
(Continued)

(51) Int. Cl.
*F04D 29/00* (2006.01)
*F04D 29/02* (2006.01)
(Continued)

(52) U.S. Cl.
CPC ......... *F04D 29/326* (2013.01); *F04D 29/023* (2013.01); *F04D 29/388* (2013.01); *F05D 2230/20* (2013.01)

(58) Field of Classification Search
CPC .... F04D 29/023; F04D 29/326; F04D 29/388; F05D 2230/20
See application file for complete search history.

(56) References Cited

U.S. PATENT DOCUMENTS 1,370,083 A * 3/1921 Blackmore ............... F01P 5/02
29/889.3
5,489,186 A * 2/1996 Yapp ....................... F01D 5/141
415/58.7
(Continued)

FOREIGN PATENT DOCUMENTS

DE 102013015835 A1 * 4/2015 ........... F04D 29/326
DE 102016207545 A1 11/2017
(Continued)

OTHER PUBLICATIONS

International Search Report and Written Opinion for Application No. PCT/EP2021/058881 dated Jun. 17, 2021 (13 pages).

*Primary Examiner* — Matthew T Largi
(74) *Attorney, Agent, or Firm* — Michael Best & Friedrich LLP

(57) ABSTRACT

A fan includes a hub configured to be driven by motor to rotate about a fan rotational axis, blades that protrude radially from the hub and a band that surrounds the rotational axis and connects the tips of the blades. The band includes features that structurally reinforce the knit lines. In some embodiments, the features are thickened regions that protrude from outer surface of the band in a direction away from the hub. A thickened region is disposed between respective tips of each pair of adjacent blades. In some embodiments, the features are structurally—reinforcing ribs that protrude from the hub-facing surface of the band. A rib is disposed between respective tips of each pair of adjacent blades. In some embodiments, the features are both ribs and thickened regions.

14 Claims, 11 Drawing Sheets

Related U.S. Application Data on Feb. 9, 2021, provisional application No. 63/107,753, filed on Oct. 30, 2020, provisional application No. 63/006,840, filed on Apr. 8, 2020, provisional application No. 63/006,846, filed on Apr. 8, 2020.

(51) Int. Cl.

*F04D 29/32* (2006.01)
*F04D 29/38* (2006.01)

(56) References Cited

U.S. PATENT DOCUMENTS 5,810,555 A * 9/1998 Savage ................. F04D 29/326 416/189
10,563,664 B2 2/2020 Springer et al.
2002/0164247 A1 11/2002 Nadeau et al.
2018/0202452 A1* 7/2018 Springer ............... F04D 29/164

FOREIGN PATENT DOCUMENTS

JP 2003094494 A 4/2003
KR 20150100307 A 9/2015

* cited by examiner

BANDED COOLING FAN BAND HAVING KNIT-LINE STRENGTH IMPROVEMENT

BACKGROUND

Automobiles typically require one or more air-moving fans to aid in heat-transfer through one or more heat-exchangers. For example, an axial flow fan may be used for automotive cooling that includes a hub coupled to a shaft of a motor, a plurality of blades that protrude from an outer circumference of the hub, and a band that connects tips of the blades so as to prevent the blades from being deformed.

Such fans are often manufactured in large volumes via a plastic injection molding process in which a mold of the fan 100 is injected with molten plastic in the vicinity of the hub-forming portion (FIG. 1). From the injection point(s) 101, the molten plastic (represented by arrows) flows within the mold cavity from the hub-forming portion, radially outward through the blade forming portions, and then circumferentially along the band-forming portion. When two flow-fronts meet within the band-forming portion, a knit-line 150 is formed in the resulting fan band 120. Knit-lines 150 are formed in the band 120 approximately mid-way between each pair of adjacent fan blades 140. Knit-lines 150 are typically weaker than other regions of the band 120 where there are no knit-lines 150, and thus may be a point of failure initialization within the fan 100.

The fan band knit line strength could be improved by simply uniformly increasing band thickness. But as thickness is added, the mass of the band increases and therefore the centrifugal stresses increase. Additionally, adding mass to an injection molded part far from the injection location is undesirable from a molding best-practices standpoint.

SUMMARY

In some aspects, a banded fan includes structurally reinforced knit-lines that improve the strength of band knit regions, thereby increasing overall the structural robustness of the fan.

To increase the stiffness and strength of the fan band between fan blades, where the band knit-line occurs, reinforcing ribs may be provided on the hub-facing surface of the fan band cylindrical portion. Each rib protrudes inward toward the hub and extends circumferentially across (or "bridges") the knit-line. Each rib has a complex shape that minimizes air flow losses and unwanted noise, and is dimensioned to lower stress in the band while ensuring that the knit-line is bridged.

In some aspects, a fan includes a hub configured to be driven by motor to rotate about a fan rotational axis, and a band that surrounds the rotational axis and is concentric with the hub. The band includes a cylindrical portion that extends in parallel to the fan rotational axis, a lip portion that extends in a direction perpendicular to the fan rotational axis, and an intermediate portion that connects one end of the cylindrical portion to one end of the lip portion. The fan includes blades that protrude radially from the hub. Each blade has a root that is connected to the hub and a tip that is connected to a hub-facing surface of the cylindrical portion. The fan also includes a structurally-reinforcing rib that protrudes from the hub-facing surface of the cylindrical portion. The rib is disposed between respective tips of an adjacent pair of the blades. A circumferential dimension of the rib is at least 40 percent of a distance along the hub-facing surface between the respective tips of the blades of the adjacent pair of the blades.

In some embodiments, the reinforcing rib includes a leading end, a trailing end that is opposed to the leading end and is circumferentially spaced apart from the leading end, and opposed side surfaces that extend between the leading end and the trailing end. The circumferential dimension of the rib corresponds to a distance between the leading end and the trailing end. The circumferential dimension of the rib is greater than a thickness dimension of the rib, where the thickness dimension of the rib corresponds to a distance between the opposed side surfaces. In addition, the leading end and the trailing end are rounded.

In some embodiments, the circumferential dimension of the rib is at least ten times the thickness dimension.

In some embodiments, a radial dimension of the rib is non-uniform along the circumferential dimension of the rib.

In some embodiments, a radial dimension of the rib at the leading end and the trailing end is less than a radial dimension of the rib at a location that is midway between the leading end and the trailing end.

In some embodiments, a radial dimension of the rib is at most twenty percent of a blade span, the blade span corresponding to a distance between the root and the tip of one of the blades.

In some embodiments, the rib comprises a plurality of ribs, each rib being disposed between a pair of adjacent blades such that a single rib is disposed between the blades of a given pair of adjacent blades, and the circumferential dimension of the rib is proportional to the spacing between the respective tips of the blades of the given pair of adjacent blades.

In some embodiments, number of ribs equals the number of blades.

In some embodiments, the rib is disposed mid-way between the tips of the blades of the adjacent pair of the blades.

In some embodiments, the rib is disposed closer to a tip of one of the blades of the adjacent pair of blades than to the other of the blades of the adjacent pair of blades.

In some embodiments, the rib extends onto the intermediate portion.

To increase the stiffness and strength of the fan band between fan blades, where the band knit-line occurs, the band may include regions of increased radial thickness (referred to as "thickened regions") that are provided on the outward-facing surface of the fan band cylindrical portion. Each thickened region protrudes outward away from the hub and extends circumferentially across (or "bridges") the knit-line. Each thickened region is configured to have a smooth transition to other portions of the band outward-facing surface, and is dimensioned to lower stress in the band while ensuring that the knit-line is bridged and adequately reinforced.

By provided localized regions of increased thickness, the fan band knit line strength is improved while minimizing band mass increases, and thus also minimizing corresponding increases in the centrifugal stresses. In addition, the undesirable effects of added band thickness are minimized by limiting the band thickness addition to (1) the cylindrical portion of the band and (2) to regions of the band that are not radially aligned with the fan blades. This added thickness strategy adds strength to the weak band knit lines and does so efficiently by avoiding adding mass where it will not increase knit strength.

In some aspects, a fan includes a hub configured to be driven by motor to rotate about a fan rotational axis, and a band that surrounds the rotational axis and is concentric with the hub. The band includes a leading end that faces a direction of airflow through the fan, and a trailing end that is opposed to the leading edge. The fan includes blades that protrude radially from the hub. Each blade has a root that is connected to the hub and a tip that is connected to a hub-facing surface of the band. A distance between the fan rotational axis and the band is constant for every location along a line that extends about the circumferences of the band, where the line is disposed on the hub-facing surface of the band at the band trailing end. In addition, a radial dimension of the band is non-uniform along the line.

In some embodiments, the band includes a cylindrical portion, a lip portion and an intermediate portion. The cylindrical portion extends in parallel to the fan rotational axis and includes the band trailing end. The lip portion extends at an angle relative to the fan rotational axis. A surface of the lip portion includes the band leading end. The intermediate portion connects one end of the cylindrical portion to one end of the lip portion. The tip of each blade is joined to the cylindrical portion along a corresponding blade tip region. The cylindrical portion includes first regions of the line having a first radial dimension and second regions of the line having a second radial dimension. The second radial dimension is less than the first radial dimension. The first regions of the line are disposed between respective blade tip regions of tips of a pair of adjacent blades, and the second regions of the line are radially aligned with the respective blade tip regions.

In some embodiments, the first radial dimension is greater than an axial dimension of the lip portion.

In some embodiments, the first radial dimension is at least five percent greater than the second radial dimension.

In some embodiments, a dimension of the intermediate portion is non-uniform along a circumference of the band such that the dimension of the intermediate portion at locations radially aligned with the first regions of the line is greater than corresponding dimensions of the intermediate portion at locations radially aligned with the second regions of the line.

In some embodiments, the cylindrical portion includes third regions of the line having a tapered radial dimension. The third regions of the line provide a transition between the first regions of the line and the second regions of the line, wherein a circumferential dimension of each third region of the line is at least as long as a circumferential dimension of the first region of the line that it adjoins.

In some embodiments, the cylindrical portion includes third regions of the line having a tapered radial dimension. The third regions of the line provide a transition between the first regions of the line and the second regions of the line, wherein a sum of the circumferential dimensions of one of the first regions of the line and each adjoining third region of the line is at least fifty percent of a distance between tips of adjacent blades.

In some embodiments, the radial dimension of the band is non-uniform along the line such that the radial dimension varies periodically along the circumference of the band. In addition, the radial dimension is a maximum at locations between adjacent blades and is a minimum at locations aligned with a blade.

In some embodiments, the band includes a cylindrical portion, a lip portion and an intermediate portion. The cylindrical portion extends in parallel to the fan rotational axis, and includes the band leading end. The lip portion extends at an angle relative to the fan rotational axis. A surface of the lip portion includes the band trailing end. The intermediate portion connects one end of the cylindrical portion to one end of the lip portion. The tip of each blade is joined to the cylindrical portion along a corresponding blade tip region. The cylindrical portion includes first regions of the line having a first radial dimension and second regions of the line having a second radial dimension. The second radial dimension is less than the first radial dimension. The first regions of the line are disposed between respective blade tip regions of tips of a pair of adjacent blades. In addition, the second regions of the line are radially aligned with the respective blade tip regions.

In some aspects, a fan includes a hub configured to be driven by motor to rotate about a fan rotational axis, and a band that surrounds the rotational axis and is concentric with the hub. The band includes a leading end that faces a direction of airflow through the fan, and a trailing end that is opposed to the leading edge. The fan includes blades that protrude radially from the hub, each blade including a root that is connected to the hub and a tip that is connected to a hub-facing surface of the band. A distance between the fan rotational axis and the band is constant for every location along a line that extends about the circumferences of the band, where the line is disposed on the hub-facing surface of the band at the band trailing end. A radial dimension of the band is non-uniform along the line such that the radial dimension varies periodically along the circumference of the band, and the radial dimension has a maximum value at locations between adjacent blades and a minimum value at locations aligned with a blade.

In some aspects, a fan includes a hub configured to be driven by motor to rotate about a fan rotational axis, and a band that surrounds the rotational axis and is concentric with the hub. The band includes a cylindrical portion that extends in parallel to the fan rotational axis, a lip portion that extends in at an angle to the fan rotational axis, and an intermediate portion that connects one end of the cylindrical portion to one end of the lip portion. The fan includes blades that protrude radially from the hub, each blade having a root that is connected to the hub and a tip that is connected to a hub-facing surface of the cylindrical portion. In addition, the fan includes structurally-reinforcing ribs that protrude from the hub-facing surface of the cylindrical portion, the ribs disposed between respective tips of each adjacent pair of the blades. A distance between the fan rotational axis and the band is constant for every location along a line that extends about the circumferences of the band, where the line is disposed on the hub-facing surface of the band at the band trailing end, and a radial dimension of the band is non-uniform along the line.

In some embodiments, a distance between the respective tips of the blades of a given adjacent pair of blades corresponds to an interblade arc length, and a circumferential dimension of a rib that is disposed between the blades of the given adjacent pair of blades is at least 40 percent of the interblade arc length.

In some embodiments, the radial dimension of the band varies periodically along the circumference of the band, and the radial dimension of the band has a maximum value at locations between adjacent blades and a minimum value at locations aligned with a blade.

In some embodiments, the radial dimension of the band has a maximum value at locations corresponding to a location of a rib.

In some embodiments, the rib includes a rib leading end, a rib trailing end that is opposed to the rib leading end and is circumferentially spaced apart from the rib leading end, and a rib midpoint that is disposed mid way between the rib leading end and the rib trailing end. The radial dimension of the band has a maximum value at locations corresponding to location of a rib midpoint.

DETAILED DESCRIPTION

Figure 1:
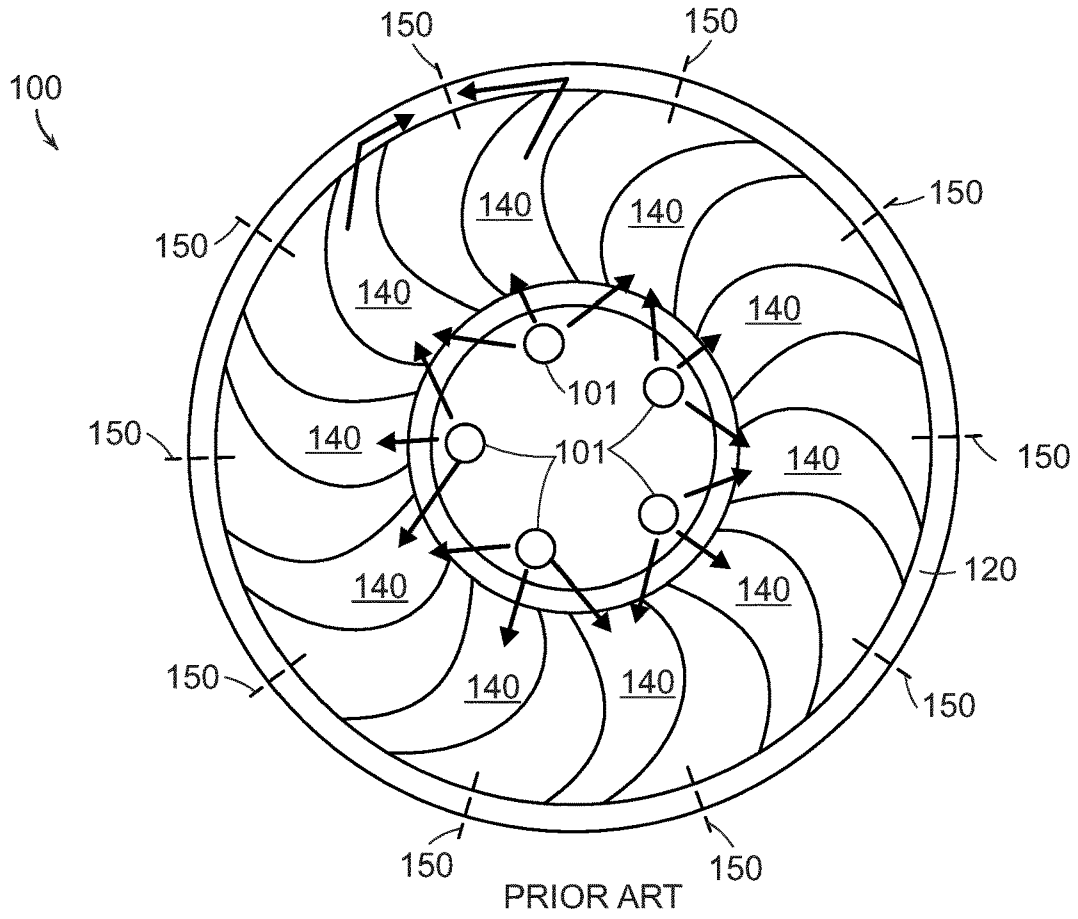
FIG. 1 is a schematic top plan view of a banded cooling fan marked with a) circles identifying locations of injection of molten plastic during an injection molding process of the fan; b) arrows showing a direction of flow of the molten plastic through a mold cavity during the injection molding process; and c) broken lines indicating locations of knit-lines between pairs of adjacent fan blades.
Figure 2:
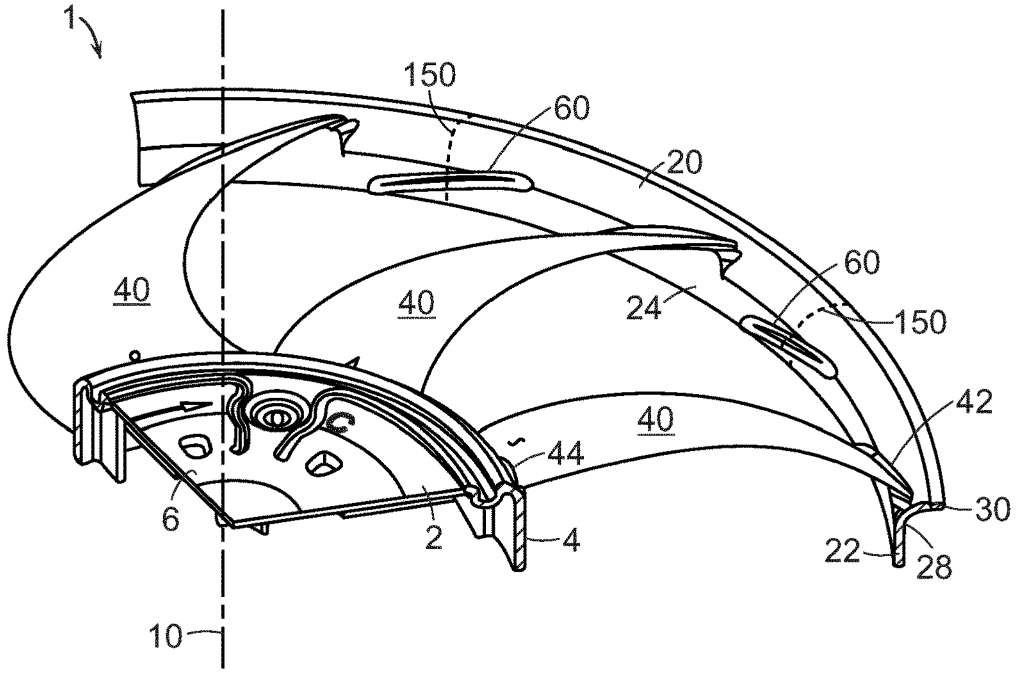
FIG. 2 is a perspective view of a portion of a banded cooling fan that includes a reinforcing rib, in which broken lines indicate locations of knit-lines between pairs of adjacent fan blades.
Figure 3:
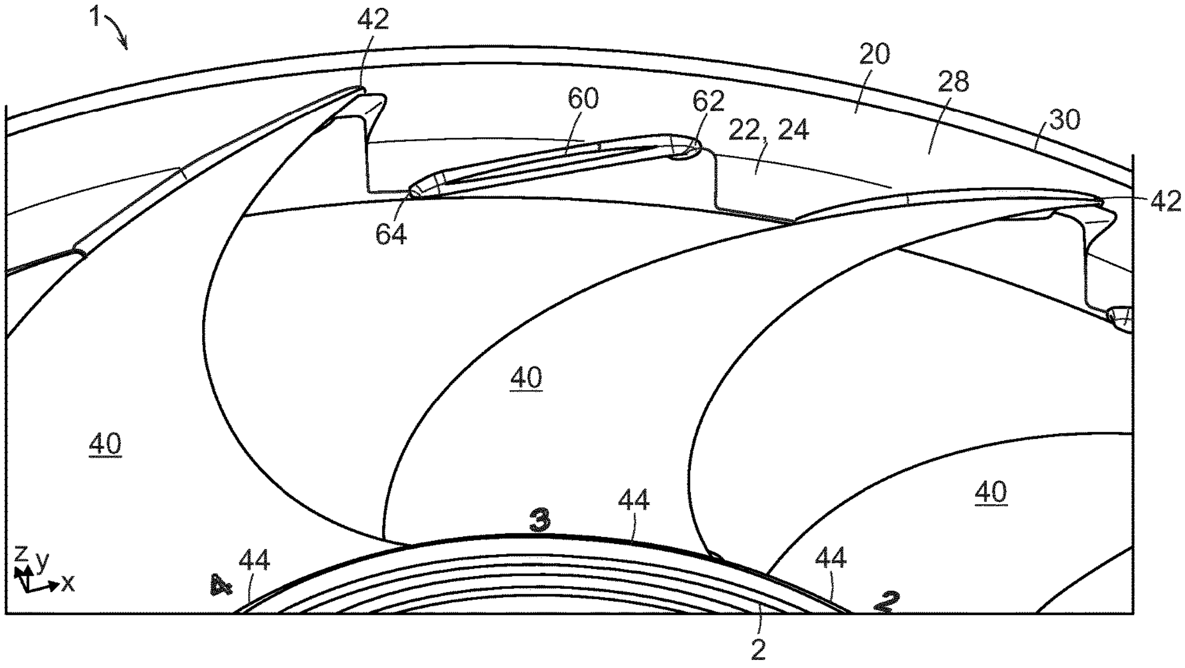
FIG. 3 is a perspective view of another portion of the banded cooling fan of FIG. 2.
Figure 4:
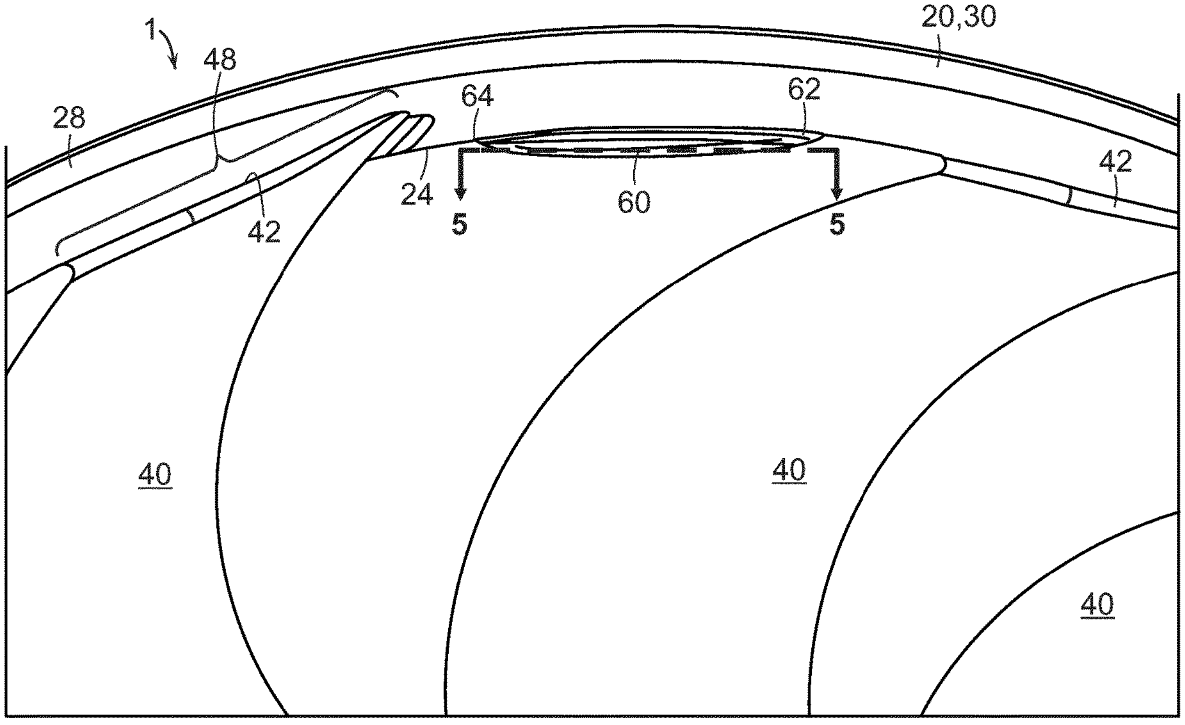
FIG. 4 is a top plan view of the portion of the banded cooling fan of FIG. 2.

Referring to FIGS. 2-8, an axial flow fan 1, which may be used for cooling heat exchange medium passing an inside of a heat exchanger such as a radiator of an automobile, is provided with a hub 2 that is coupled to a driving source (not shown) such as a motor. The fan 1 includes a plurality of blades 40 that protrude radially outward from the hub 2. In addition, the fan 1 includes a band 20 that surrounds the hub and connects the tips 42 of each blade 40 so as to prevent the blades 40 from being deformed. The hub 2, the blades 40 and the band 20 are formed as a single piece, for example in an injection molding process. The fan 1 is rotated by rotational force transferred from the motor to the hub 2. In the illustrated embodiment, the fan 1 rotates about the fan rotational axis 10 in the clockwise direction with respect to the view shown in FIG. 2, and the air flow direction, represented by the arrow A, is parallel to the fan rotational axis 10. The band 20 includes structurally reinforced knit-lines that improve the strength of band knit regions, thereby increasing overall the structural robustness of the fan. In some embodiments, the band 20 includes reinforcing ribs 60 that reduce band stress and increase the structural integrity of the band 20 in the vicinity of the knit-lines 150. In other embodiments, the band 20 includes thickened regions 160 that reduce band stress and increase the structural integrity of the band 20 in the vicinity of the knit-lines 150. In still other embodiments, the band 20 includes both reinforcing ribs and thickened regions 160. The reinforcing ribs 60 and the thickened regions 160 are described in detail below.

The hub 2 is a hollow cylinder that is closed at one end by an end surface 6 that is perpendicular to the fan rotational axis 10. An outer circumference 4 of the hub 2 faces the band 20.

Each blade 40 includes a root 44 that is coupled to the band-facing surface 4 of the hub 2, and a tip 42 that is spaced apart from the root 44. Each tip 42 is coupled to a hub-facing surface 24 of the band 20. The air-flow directing surfaces of each blade 40 have a complex, three-dimensional curvature that is determined by the requirements of the specific application. The blade configuration, including the number of blades 40 employed by the fan 1, the shape of the blades 40, the blade spacing, etc., are also determined by the requirements of the specific application.

The direction of the air flow that is discharged from the fan 1 is dependent at least in part on the blade curvature, and includes a substantial axial flow component. As used herein, the term "axial flow component" refers to a component of air flow that flows in a direction parallel to the fan rotational axis 10.

The band 20 is a generally L-shaped circumferential ring that is concentric with hub 2 and is spaced radially outward from hub 2. In particular, the band 20 includes a cylindrical portion 22 that corresponds to one leg of the L-shape and extends in parallel to the fan rotational axis 10. The band 20 includes a lip portion 30 that corresponds to the other leg of the L-shape and extends at an angle to the fan rotational axis 10. In the illustrated embodiment, the lip portion 30 is perpendicular to the cylindrical portion 22, and provides the leading end 25 of the band 20 with respect to the direction A of air flow through the fan 1. In addition the band 20 includes a curved intermediate portion 28 that connects one end of the cylindrical portion 22 to one end of the lip portion 30. The cylindrical portion 22 encircles the hub 2, and the lip portion 30 protrudes from the cylindrical portion 22 in a direction away from the hub 2.

The band 20 has a first surface 21 that faces, and comes into contact with, air flowing through the fan 1, and a second surface 23 that is opposed to the first surface. Accordingly, the hub-facing surface 24 of the cylindrical portion 22 provides a portion of the first surface 21.

Each blade tip 42 is joined to the hub-facing surface 24 of the cylindrical portion 22 along a circumferentially-extending region referred to as the "blade-tip region" 48 of the cylindrical portion 22.

The band 20 includes structurally-reinforcing ribs 60 that protrude from the hub-facing surface 24 of the cylindrical portion 22. Each rib 60 includes a leading end 62, and a trailing end 64 that is opposed to the leading end 62 and is spaced apart from the leading end 62 along a circumference of the band 20. Each rib 60 includes opposed side surfaces 66, 68 that extend between the leading end 62 and the trailing end 64, and are spaced apart from each other in a direction parallel to the fan rotational axis 10. In the illustrated embodiment, the opposed side surfaces 66, 68 are generally linear and parallel to each other.

In some embodiments, the cross-sectional shape of the ribs 60 is "blade-like". As used herein, the term "blade-like" refers to having an aerodynamic shape, that is, a shape that reduces the drag from air moving past the rib 60. For example, the ribs 60 are generally aligned with the direction of air flow along the hub-facing surface 24 of the band 20, and include rounded leading and trailing ends 62, 64. By configuring the ribs 60 to have the shape of a blade, undesirable noise and undesirable aerodynamic losses are minimized.

Figure 5:
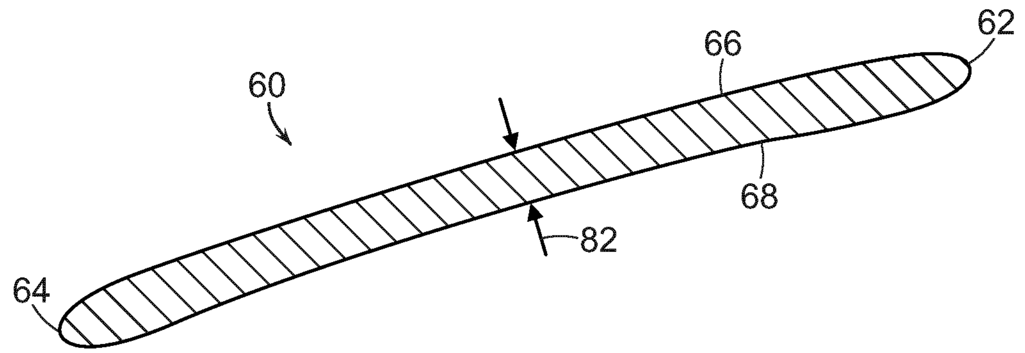
FIG. 5 is a cross-sectional view of the rib of FIG. 2 as seen along line 5-5 of FIG. 4.
Figure 6:
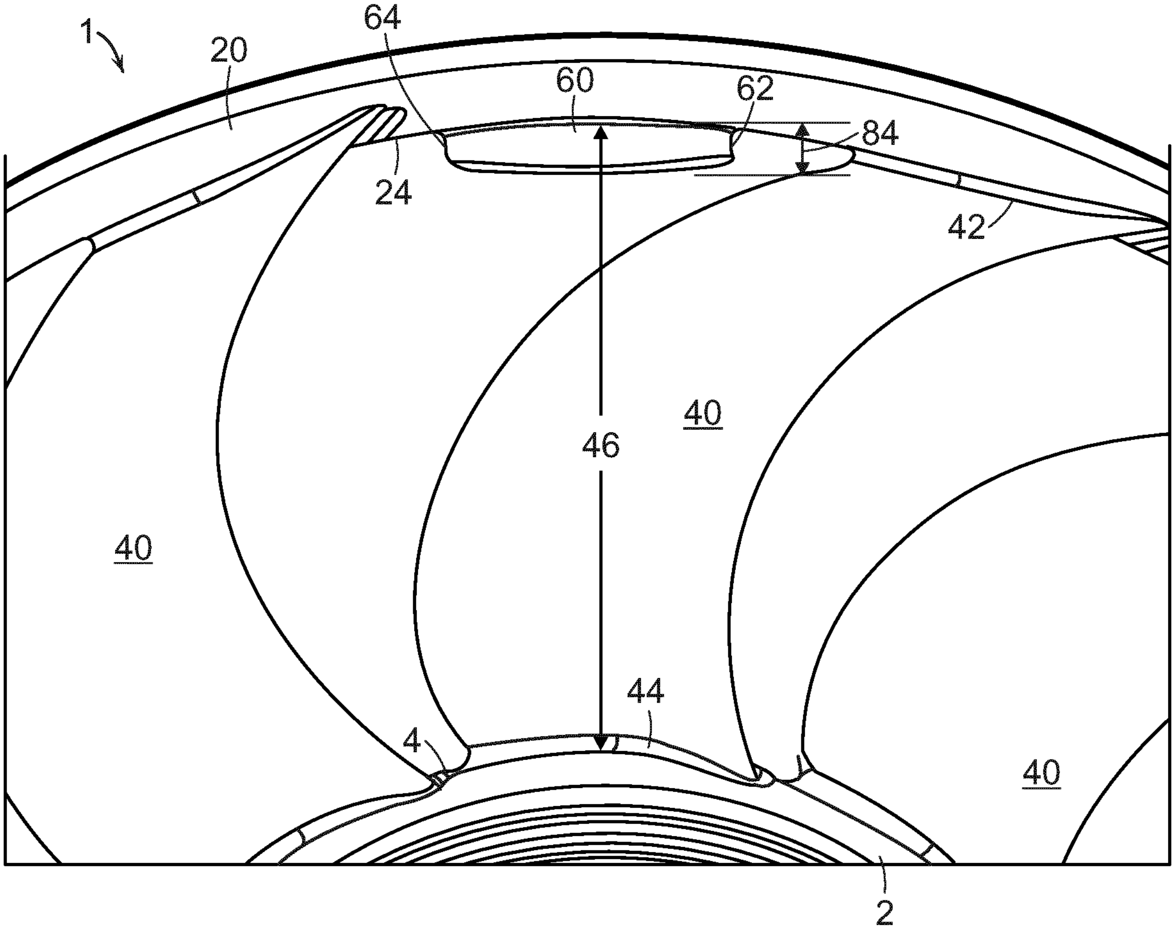
FIG. 6 is a top plan view of the portion of the banded cooling fan of FIG. 2 including markings showing the radial dimension of the rib and a blade radial span, and illustrating the rib with a slightly exaggerated radial dimension to allow visualization of the radial dimension of the rib.
Figure 7:
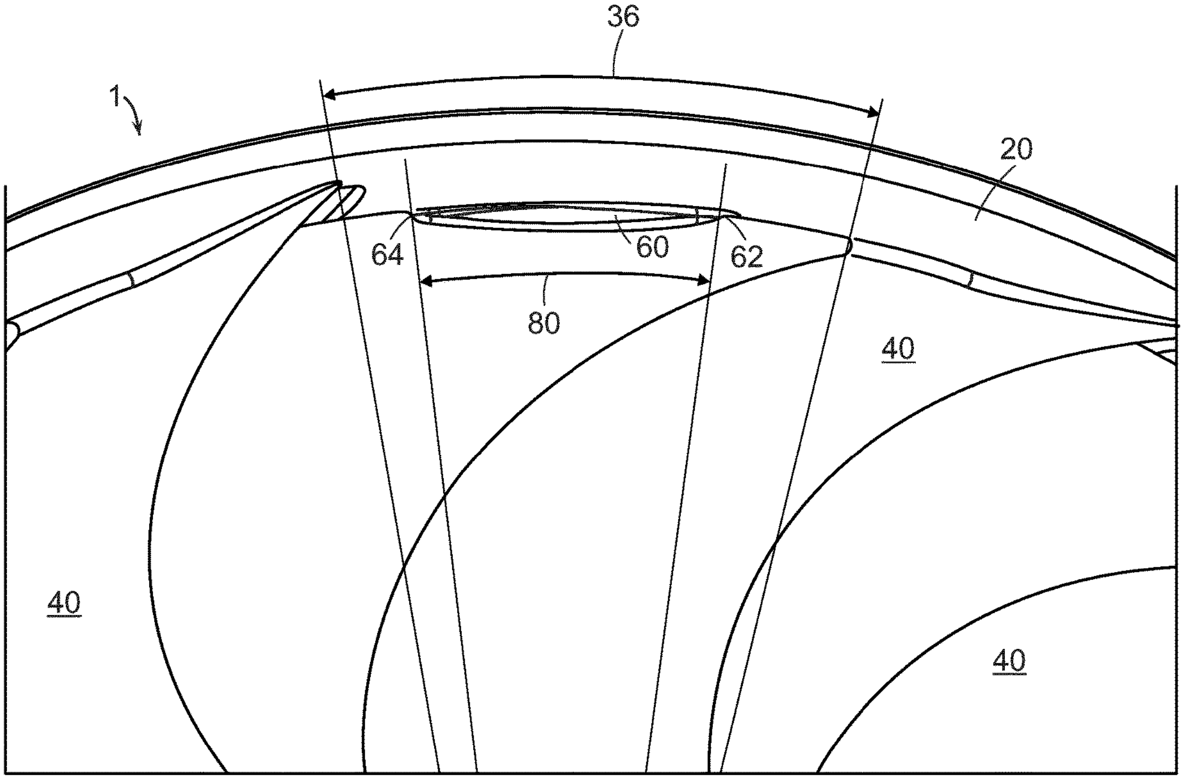
FIG. 7 is a top plan view of the portion of the banded cooling fan of FIG. 2 including markings showing the circumferential dimension of the rib and the inter-blade arc length.
Figure 8:
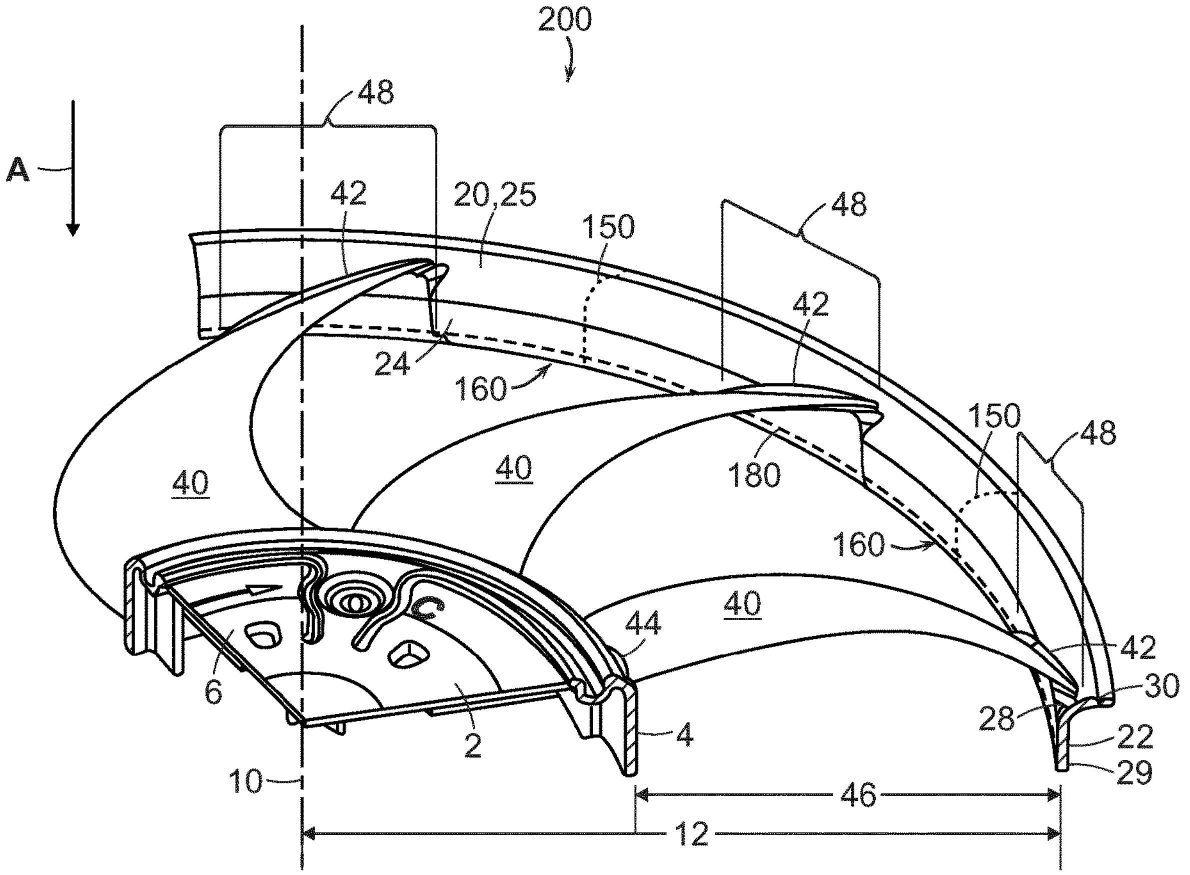
FIG. 8 is a perspective view of a portion of a banded cooling fan that includes reinforcing thickened regions, in which broken lines indicate locations of knit-lines between pairs of adjacent fan blades.
Figure 9:
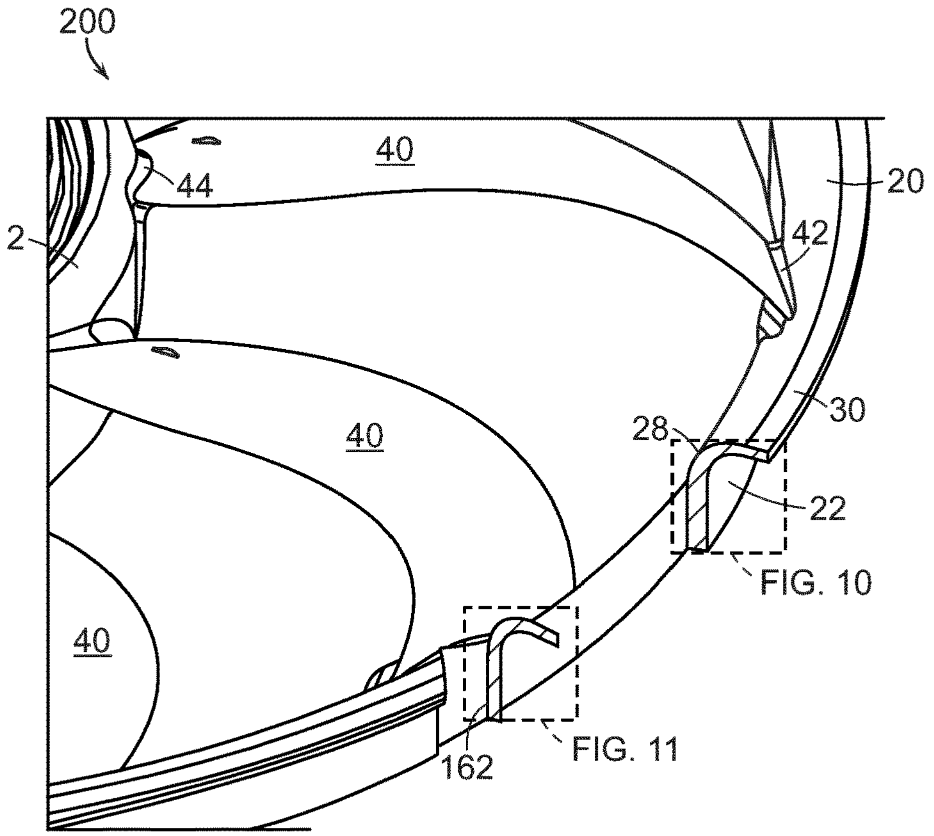
FIG. 9 is a perspective view of a portion of the banded cooling fan of FIG. 8 illustrating the band with cut-away portions showing a cross section of the band at the knit-line and a cross section of the band at the blade tip region.
Figure 10:
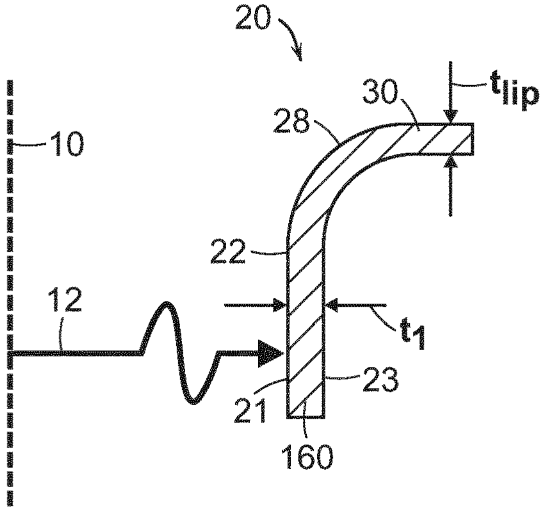
FIG. 10 is a cross-sectional view of the band at the location referenced in FIG. 9 as "FIG. 10."
Figure 11:
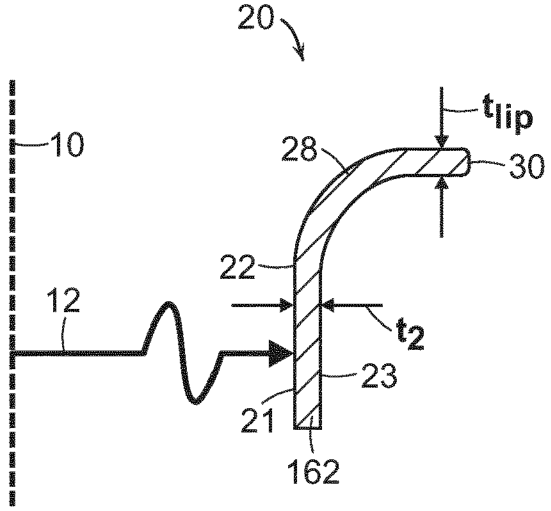
FIG. 11 is a cross-sectional view of the band at the location referenced in FIG. 9 as "FIG. 11."
Figure 12:
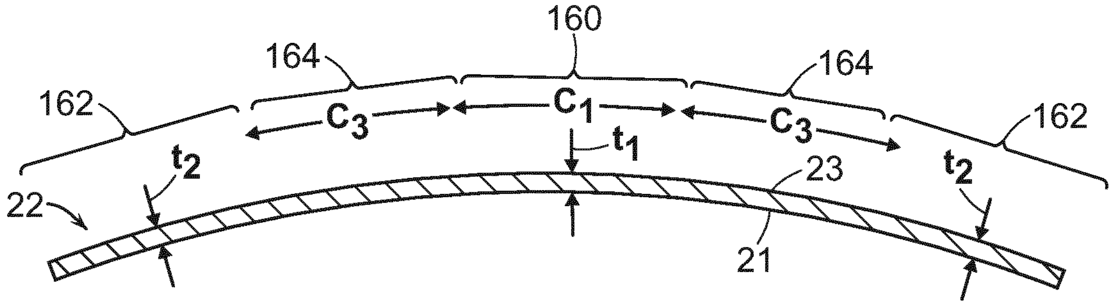
FIG. 12 is a cross-sectional view of the band as seen along line A1-A1 of FIG. 13.
Figure 13:
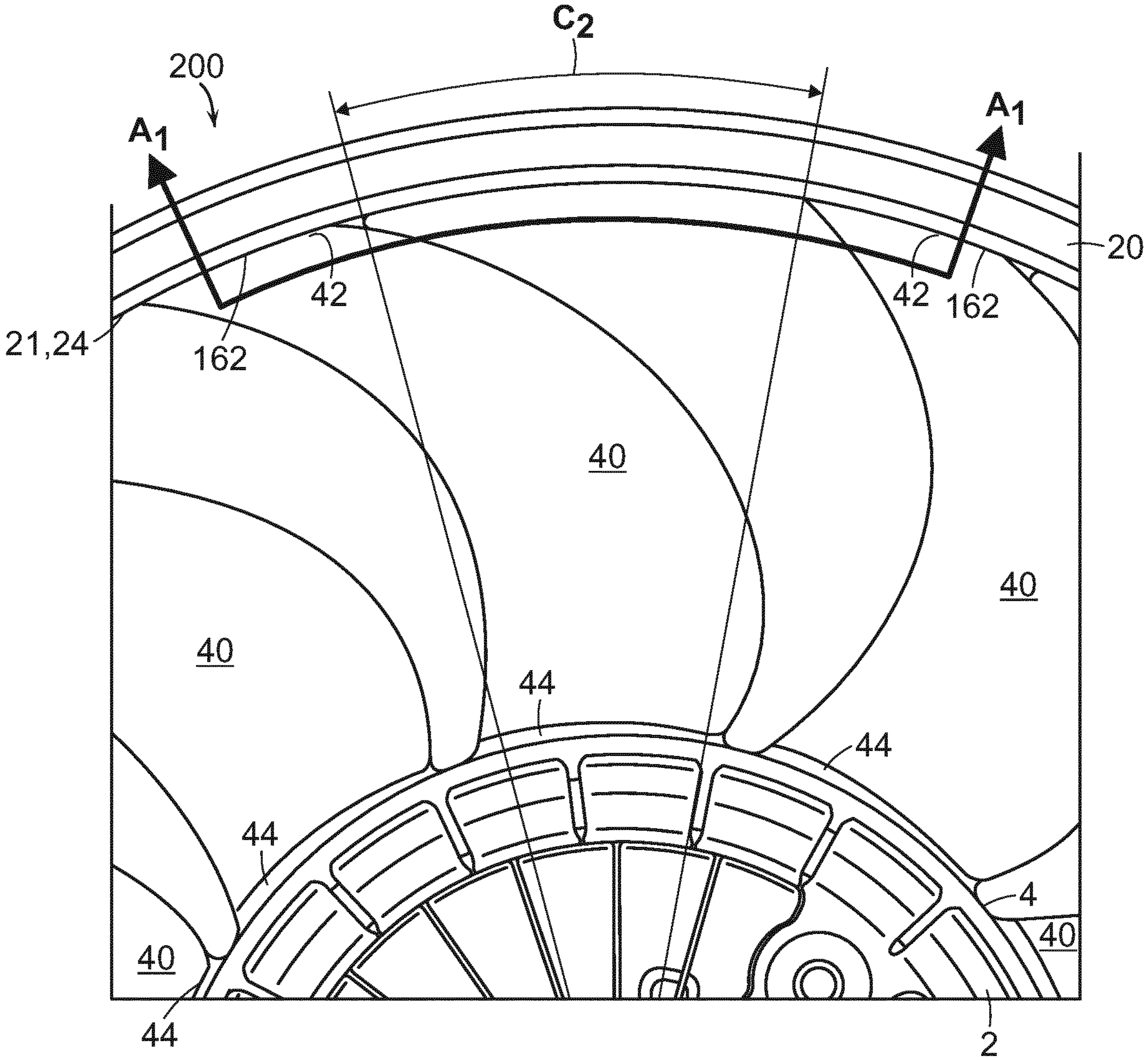
FIG. 13 is a bottom plan view of a portion of the fan of FIG. 9.

Each rib 60 is elongated in that the circumferential dimension 80 of the rib 60 (e.g., a distance between the leading end 62 and the trailing end 64 along a circumference of the hub-facing surface 24, FIG. 7) is greater than a thickness dimension 82 of the rib 60 (e.g., a distance between the opposed side surfaces 66, 68, FIG. 5). The circumferential dimension 80 of the rib 60 is at least ten times the thickness dimension 82. For example, in the illustrated embodiment, the circumferential dimension 80 of the rib 60 is about twenty times the thickness dimension.

The band 20 includes a rib 60 disposed between each pair of adjacent blades 40 such that a single rib 60 is disposed between the blades 40 of a given pair of adjacent blades 40. In addition, the circumferential dimension 80 of the rib 60 is proportional to the spacing between the respective tips 42 of the adjacent blades 40. In the illustrated embodiment, the number of ribs 60 equals the number of blades 40.

The ribs 60 are disposed between respective tips 42 of an adjacent pair of the blades 40. In the illustrated embodiment the rib 60 is disposed mid-way between the respective tips 42 of the adjacent pair of blades 40 so as to extend across the corresponding knit-line 150. However, in applications in which the knit-line 150 is not disposed mid-way between the respective tips 42, such as might occur in fans having unequal blade spacing, it is understood that the rib 60 may be offset toward one blade of the adjacent pair of blades in order to bridge the knit-line 150.

In some embodiments, a circumferential dimension 80 of each rib 60 is at least 40 percent of the inter-blade arc length 36 (e.g., a distance along the hub-facing surface 24 between the respective tips 42, or blade tip regions 48, of adjacent blades 40, FIG. 7). Having such a large circumferential extent ensures that the band knit-line 150 will lie in the radial projection of the reinforcing rib 60. This ensures that the ribs 60 properly reinforce the respective knit-lines 150 even when there are relatively large variations in the location of plastic injection during the manufacturing process. In some embodiments, the ribs 60 extend circumferentially to an extent that the ribs 60 extend beyond the hub-facing surface 24 onto the curved intermediate portion 28 of the band 20.

To further reduce drag, each rib 60 has a non-uniform radial dimension 84 along the circumferential dimension of the rib 60, where the term "radial" is used with reference to the fan rotational axis 10. For example, the leading end 62 and the trailing end 64 of each rib 60 may have a smaller radial dimension 84 than a midportion of each rib 60. The ribs 60 have a low profile, in that the radial dimension 84 of the rib 60 is at most twenty percent of a blade span 46, where the blade span 46 corresponding to the distance between the root 44 and the tip 42 of one of the blades 40. This configuration reduces unwanted noise and aerodynamic issues such as air flow losses.

Referring to FIGS. 8-13, an alternative embodiment fan 200 includes structural features that provide structural reinforcement of the knit lines 150. The alternative embodiment fan 200 is an axial flow fan that is similar to the axial flow fan 1 described above with respect to FIGS. 1-7, and common reference numbers are used to refer to common elements. The fan 200 of FIGS. 8-13 differs from the previous embodiment in that the reinforcing ribs 60 are omitted, and the cylindrical portion 22 of the band 20 includes structurally-reinforcing thickened regions 160 that protrude from the second surface 23. As used herein, references to the thickness of the band 20 refer to a distance between the first surface 21 and the second surface 23. Within the cylindrical portion 22, the thickness of the band 20 corresponds to the radial dimension of the band 20, whereas within the lip portion 30, the thickness of the band 20 corresponds to the axial dimension of the band 20.

Since the fan 200 is injection molded, the fan 200 includes structures that facilitate the injection molding manufacturing process. For example, the hub 2 and band 20 may have a draft angle that allows the fan 200 to be removed from a mold. In another example, the surfaces of the hub 2 and band 20 that face each other may include shut offs that control flow of molten plastic within the mold in the vicinity of the parting line. Although the band 20 includes features such as draft and shutoffs that are required for manufacturing purposes and that affect the thickness of the band 20, such manufacturing-related features do not reinforce the knit-lines 150 and are not considered to be part of the thickened regions 160. Since the manufacturing-related features such as draft and shut-offs do not extend to a trailing end 29 of the band (e.g., the end of the band 20 that is most downstream with respect to the direction A of air flow through the fan 200), the thickened region 160 may be defined with respect to a line 180 that extends about a circumference of the band, where the line 180 is disposed on the hub-facing surface 24 of the band 20 at the trailing end 29, and is represented as a dot-dash line in FIG. 8. In particular, the distance 12 between the fan rotational axis 10 and the hub-facing surface 24 of the band 20 is constant for every location along the line 180, and the radial dimension of the band 20 is non-uniform along the line 180. That is, the thickened region 160 corresponds to a protrusion from the band second surface 23. It is understood that the thickened region 160 is not limited to the line 180 and extends axially between the lip portion 30 and the trailing end 29.

Each thickened region 160 has a thickness t1 that is greater than the thickness t2 of the band cylindrical portion 22 at locations spaced apart from (e.g., between) the thickened regions 160. In particular, the portions of the band cylindrical portion 22 that are radially aligned with the blade tip regions 48 are not provided with an increased thickness, and are referred to as non-thickened regions 162. In the non-thickened regions 162, the band cylindrical portion 22, the band intermediate portion 28 and the band lip portion 30 each have the thickness t2. In the illustrated embodiment, the thickness t2 of non-thickened regions 162 is equal to the thickness $t_{lip}$ of the lip portion 30. Although the thickened regions 160 may extend axially (e.g., in a direction parallel to the fan rotational axis 10) into a portion of the curved intermediate portion 28, the lip portion 30 of the band 20 is free of thickening and has a uniform thickness $t_{lip}$ about the circumference of the band 20.

In some embodiments, the thickness t1 of the thickened regions 160 is at least five percent greater than the thickness t2 of the non-thickened regions 162. In other embodiments, the thickness t1 of the thickened regions 160 is at least 10 percent, 20 percent, 30 percent, 40 percent, 50 percent or 60 percent greater than the thickness t2 of the non-thickened regions 162. The thickness t1 of the thickened regions 160 is determined based on the requirements of the specific application, while improving knit line strength and minimizing band mass increases, and thus also minimizing corresponding increases in the centrifugal stresses.

The band 20 includes a thickened region 160 disposed between each pair of adjacent blades 40 such that a single thickened region 160 is disposed between each pair of adjacent blades 40. In the illustrated embodiment, the number of thickened regions 160 equals the number of blades 40.

The thickened regions 160 are disposed between respective tips 42 of an adjacent pair of the blades 40. In the illustrated embodiment the thickened region 160 is disposed mid-way between the respective tips 42 of the adjacent pair of blades 40 so as to extend across the corresponding knit-line 150. However, in applications in which the knit-line 150 is not disposed mid-way between the respective tips 42, such as might occur in fans having unequal blade spacing, it is understood that the thickened region 160 may be offset toward one blade of the adjacent pair of blades in order to bridge the knit-line 150.

Each thickened region 160 extends circumferentially. In some embodiments, a circumferential dimension c1 of each thickened region 160 is in a range of 5 percent to 50 percent of the inter-blade arc length c2, where the inter-blade arc length corresponds to a distance along the hub-facing surface 24 between the respective tips 42, or blade tip regions 48, of adjacent blades 40.

The cylindrical portion 22 of the band 20 includes transition regions 164 that are disposed between each thickened region 160 and the adjacent blade tips 42. In some embodiments, the sum of the circumferential dimension c1 of each thickened region 160 and the circumferential dimensions c3 of the adjoining transition regions 164 is in a range of 50 percent to 100 percent of the inter-blade arc length c2.

In the embodiment illustrated in FIGS. 8-13, the circumferential dimension c3 of each of the transition regions 164 adjoining the thickened region 160 is about the same as the circumferential dimension c1 of the thickened region 160, each region 164, 160, 164 extending along approximately one-third of the inter-blade arc length c2. In other embodiments, the thickened region 160 may not extend circumferentially since the maximum thickness may occur at a single, substantially zero-width line (e.g., in this case, the circumferential dimension c1 of each thickened region 160 approaches zero), and the transition regions 164 may be relatively large so that the thickness change is very gradual across the inter-blade space.

Thus, the band cylindrical portion 22 has a non-uniform thickness along the circumference of the band 20 such that the thickness varies periodically along the circumference of the band. In addition, the cylindrical portion 22 has a maximum thickness at locations between adjacent blades 40, and a minimum thickness at locations aligned with a blade 40.

The thickened regions 160 have a low profile, in that the thickness t1 of the thickened region 160 is at most 20 percent of a blade span 46, where the blade span 46 corresponding to the distance between the root 44 and the tip 42 of one of the blades 40. This configuration minimizes fan diameter, improving packaging flexibility. In some applications such as engine cooling, an engine cooling fan may have a thickened region 160 in which the thickness t1 may be in a range of two to three percent of the blade span 46. Since the thickened regions 160 have a relatively large circumferential extent, it is assured that each band knit-line 150 will lie in the radial projection of a thickened region 160. In turn, this ensures that the thickened regions 160 properly reinforce the respective knit-lines 150 even when there are relatively large variations in the location of plastic injection during the manufacturing process.

By providing the thickened region 160 on the second surface 23 of the band 20, flow losses as air passes through the fan 200 are minimized.

Figure 14:
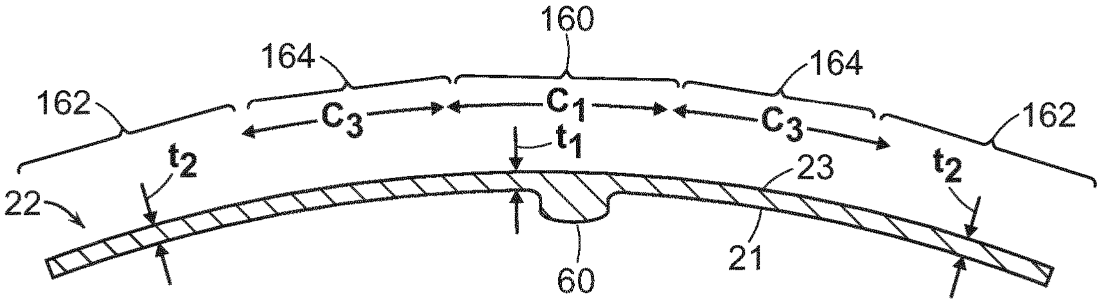
FIG. 14 is a cross-sectional view of the band as seen along line A2-A2 of FIG. 15.
Figure 15:
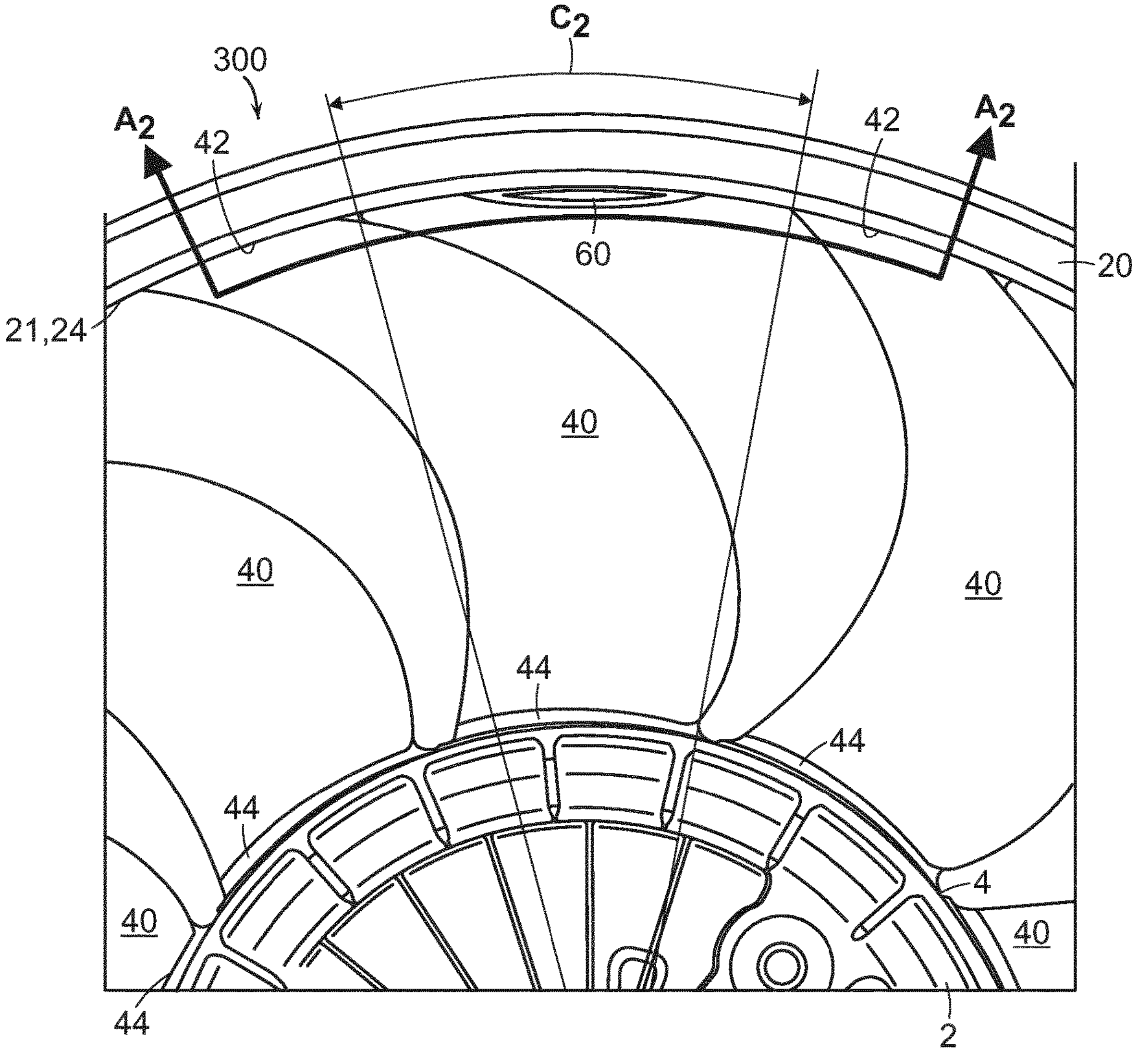
FIG. 15 is a bottom plan view of a portion of another alternative embodiment fan.

Referring to FIGS. 5 and 14-15, another alternative embodiment fan 300 includes structural features that provide structural reinforcement of the knit lines 150. The alternative embodiment fan 300 is an axial flow fan that is similar to the axial flow fans 1, 200 described above with respect to FIGS. 2-13, and common reference numbers are used to refer to common elements. The fan 300 of FIGS. 14 and 15 differs from the previous embodiments in that the fan 300 includes both the reinforcing ribs 60 that protrude toward the hub 2 from the band first surface 21 on the cylindrical portion 22 as described above with respect to FIGS. 2-7, and the thickened regions 160 that protrude from the band second surface 23 on the cylindrical portion 22 as described above with respect to FIGS. 8-13. Like the previous embodiments, in the fan 300, the reinforcing ribs 60 and the thickened regions 160 are provided at each knit line 150, and are configured to extend across the knit line 150 so as to structurally reinforce the knit line 150. In some embodiments, each rib 60 is disposed between tips 42 of adjacent blades 40 such that a midpoint 63 of the rib 60 (e.g., the point mid way between the rib leading end 62 and the rib trailing end 64) coincides with the knit line 150. For a fan having evenly spaced blades 40, this location is generally mid-way between the tips 42 of adjacent blades 40. In addition, each thickened region 160 has a maximum value at locations corresponding to a corresponding (e.g., radially aligned) rib 60. For example, in some embodiments, each thickened region 160 may be centered on a corresponding rib 60 such that the thickened regions 160 have a maximum value at locations corresponding to the midpoint 63 of each rib 60.

Figure 16:
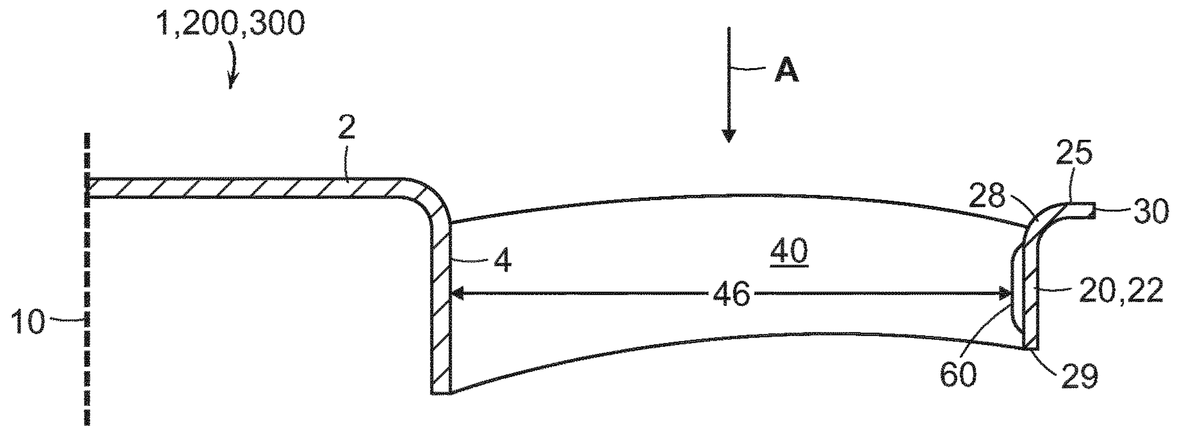
FIG. 16 is a side cross-sectional view of a portion of the fan of FIG. 15, illustrating a downstream-stator configuration.
Figure 17:
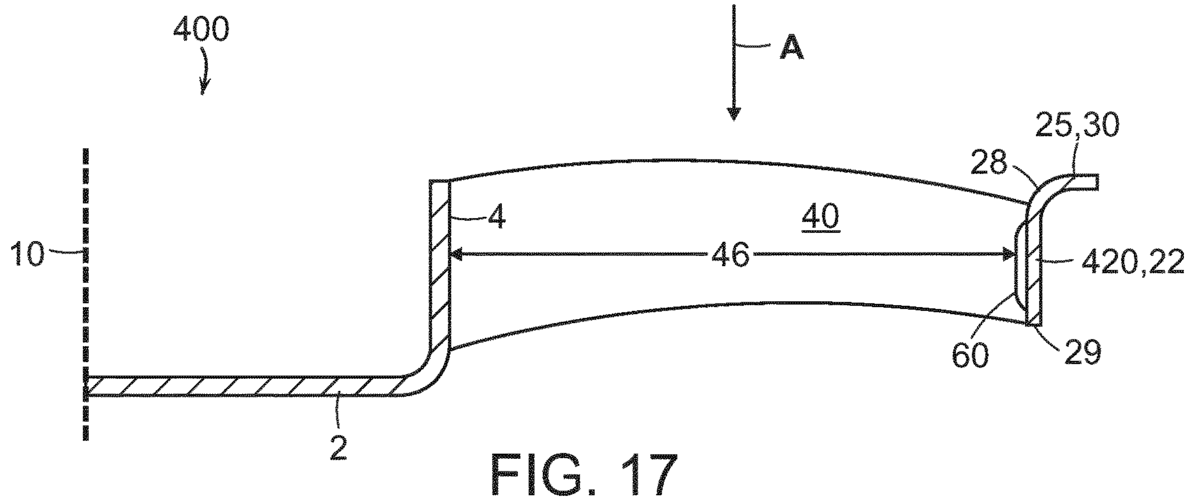
FIG. 17 is a side cross-sectional view of a portion of an alternative embodiment fan illustrating an upstream-stator configuration.
Figure 18:
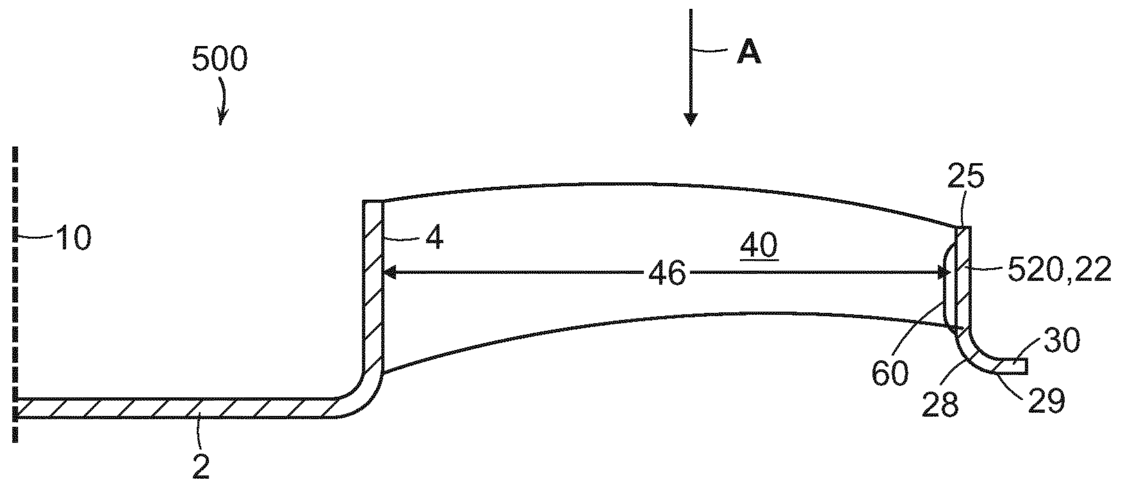
FIG. 18 is a side cross-sectional view of a portion of another alternative embodiment fan illustrating an upstream-stator configuration.
Figure 19:
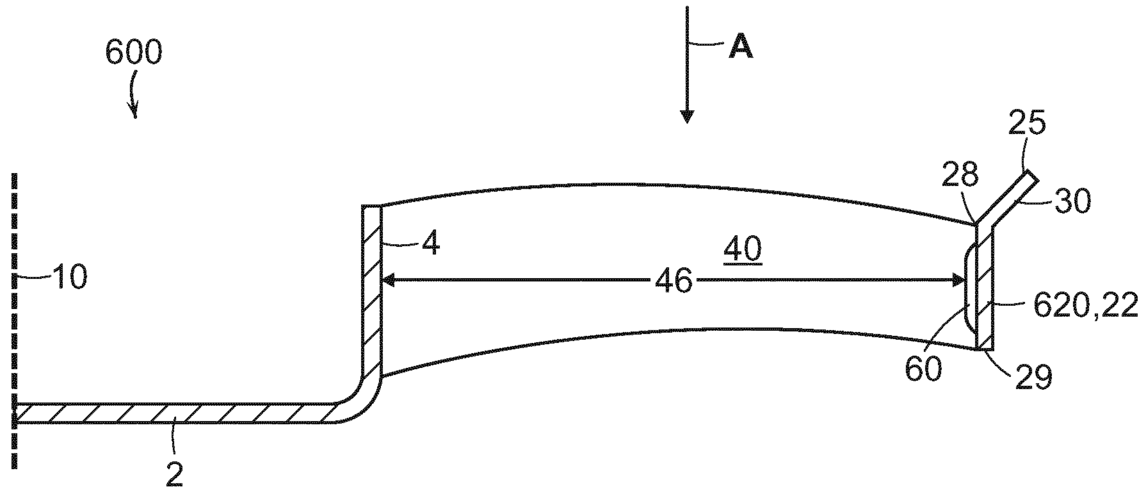
FIG. 19 is a side cross-sectional view of a portion of another alternative embodiment fan illustrating an upstream-stator configuration.

Employment of reinforcing ribs 60 and/or thickened regions 160 on the band 20 is not limited to the fans 1, 200, 300 having a downstream-stator design, as shown in FIGS. 2-15 and redrawn schematically in FIG. 16, where the stator (not shown) supports a motor (not shown) which drives the fan 200 via the hub 2. In the downstream-stator design, the stator is disposed downstream of the fan 200 with respect to the direction A of air flow through the fan 200. In the downstream-stator design, the lip portion 30 provides a leading end 25 of the band 20. The reinforcing ribs 60 and/or the thickened regions 160 can be employed to reinforce the band knit lines 150 in a fan 400 having an upstream-stator design, as shown in FIG. 17. In an upstream-design, the stator is disposed upstream of the fan 400 with respect to the direction A of air flow through the fan 400. In FIG. 17, the lip portion 30 provides the leading end 25 of the band 420. In an alternative fan 500 having an upstream-stator design (FIG. 18), the lip portion 30 provides the trailing end 29 of the band 520. Although the lip portion 30, as shown in FIGS. 16-18, may extend in a direction perpendicular to the fan rotational axis 10, the lip portion is not limited to this configuration. For example, in some embodiments, the lip portion 30 may extend at an acute angle relative to the fan rotational axis 10, as shown in the alternative band 620 of the upstream-stator design fan 600 illustrated in FIG. 19, or in downstream-stator design fans (not shown).

Although the cooling fans illustrated in FIGS. 2-19 are automotive cooling fans, the cooling fans described in FIGS. 2-19 are not limited to automotive applications. For example, the cooling fans may be used in a computer to cool a hard drive, in a heating and ventilation unit to cool a compressor, etc. Moreover, the cooling fans illustrated in FIGS. 2-19 are not limited to being used in cooling applications.

Selective illustrative embodiments of the fan are described above in some detail. It should be understood that only structures considered necessary for clarifying the fan have been described herein. Other conventional structures, and those of ancillary and auxiliary components of the fan, are assumed to be known and understood by those skilled in the art. Moreover, while a working example of the fan has been described above, the fan is not limited to the working example described above, but various design alterations may be carried out without departing from the fan as set forth in the claims.

I claim:

1. A fan, the fan comprising:

a hub configured to be driven by a motor to rotate about a fan rotational axis;

a band that surrounds the rotational axis and is concentric with the hub, the band including a cylindrical portion that extends in parallel to the fan rotational axis, a lip portion that extends at an angle to the fan rotational axis, and a curved intermediate portion that connects one end of the cylindrical portion to one end of the lip portion;

blades that protrude radially from the hub, each blade comprising a root that is connected to the hub and a tip that is connected to a hub-facing surface of the cylindrical portion; and structurally-reinforcing ribs that protrude from the hub-facing surface of the cylindrical portion, the ribs disposed between respective tips of each adjacent pair of the blades, the ribs extending onto the curved intermediate portion, wherein a distance between the fan rotational axis and the band is constant for every location along a line that extends about a circumference of the band, where the line is disposed on the hub-facing surface of the band at a band trailing end, and a radial dimension of the band is non-uniform along the line.

2. The fan of claim 1, wherein each rib includes a rib leading end, a rib trailing end that is opposed to the rib leading end and is circumferentially spaced apart from the rib leading end, and opposed side surfaces that extend between the rib leading end and the rib trailing end, and wherein a circumferential dimension of the rib corresponds to a distance between the rib leading end and the rib trailing end, the circumferential dimension of the rib is at least ten times a thickness dimension of the rib, where the thickness dimension of the rib corresponds to a distance between the opposed side surfaces, and the rib leading end and the rib trailing end are rounded.

3. The fan of claim 2, wherein each rib further includes a radial dimension at the rib leading end and the rib trailing end is less than a radial dimension of the rib at a location that is midway between the rib leading end and the rib trailing end.

4. The fan of claim 2, wherein each rib further includes a radial dimension that is at most twenty percent of a blade span, the blade span corresponding to a distance between the root and the tip of one of the blades.

5. The fan of claim 1, wherein each rib is disposed between a pair of adjacent blades such that a single rib is disposed between the blades of a given pair of adjacent blades, the line does not intersect with any of the ribs, and the radial dimension of the band has a maximum value at locations corresponding to each rib.

6. The fan of claim 1, wherein the cylindrical portion includes the band trailing end, a surface of the lip portion includes a band leading end, the tip of each blade is joined to the cylindrical portion along a corresponding blade tip region, the cylindrical portion includes first regions of the line having a first radial dimension and second regions of the line having a second radial dimension, the second radial dimension is less than the first radial dimension, the first regions of the line are disposed between respective blade tip regions of tips of a pair of adjacent blades, and the second regions of the line are radially aligned with the respective blade tip regions.

7. The fan of claim 6, wherein the first radial dimension is greater than an axial dimension of the lip portion.

8. The fan of claim 6, wherein a dimension of the curved intermediate portion is non-uniform along the circumference of the band such that the dimension of the curved intermediate portion at locations radially aligned with the first regions of the line is greater than corresponding dimensions of the curved intermediate portion at locations radially aligned with the second regions of the line.

9. The fan of claim 6, wherein the cylindrical portion includes third regions of the line having a tapered radial dimension, the third regions of the line providing a transition between the first regions of the line and the second regions of the line, wherein a circumferential dimension of each third region of the line is at least as long as a circumferential dimension of the first region of the line that it adjoins.

10. The fan of claim 6, wherein the cylindrical portion includes third regions of the line having a tapered radial dimension, the third regions of the line providing a transition between the first regions of the line and the second regions of the line, wherein a sum of circumferential dimensions of one of the first regions of the line and each adjoining third region of the line is at least fifty percent of a distance between tips of adjacent blades.

11. The fan of claim 1, wherein a distance between the respective tips of the blades of a given adjacent pair of blades corresponds to an inter-blade arc length, and a circumferential dimension of a rib that is disposed between the blades of the given adjacent pair of blades is at least 40 percent of the interblade arc length.

12. The fan of claim 1, wherein the radial dimension of the band varies periodically along the circumference of the band, and the radial dimension of the band has a maximum value at locations between adjacent blades and a minimum value at locations aligned with a blade.

13. The fan of claim 12, wherein the radial dimension of the band has a maximum value at locations corresponding to a location of a rib.

14. The fan of claim 12, wherein each rib includes a rib leading end, a rib trailing end that is opposed to the rib leading end and is circumferentially spaced apart from the rib leading end, and a rib midpoint that is disposed mid way between the rib leading end and the rib trailing end, and the radial dimension of the band has a maximum value at locations corresponding to location of a rib midpoint.

* * * * *